US012341901B1

(12) United States Patent
Liang (10) Patent No.: US 12,341,901 B1
(45) Date of Patent: Jun. 24, 2025

(54) PKI-BASED USER AUTHENTICATION FOR WEB SERVICES USING BLOCKCHAIN

(71) Applicant: United Services Automobile Association (USAA), San Antonio, TX (US)

(72) Inventor: Minya Liang, Redmond, WA (US)

(73) Assignee: United Services Automobile Association (USAA), San Antonio, TX (US)

( * ) Notice: Subject to any disclaimer, the term of this patent is extended or adjusted under 35 U.S.C. 154(b) by 0 days.

(21) Appl. No.: 18/226,116

(22) Filed: Jul. 25, 2023

Related U.S. Application Data (63) Continuation of application No. 17/068,361, filed on Oct. 12, 2020, now Pat. No. 11,711,219, which is a continuation of application No. 15/685,712, filed on Aug. 24, 2017, now Pat. No. 10,805,085.

(51) Int. Cl.
*H04L 9/32* (2006.01)
*G06Q 20/38* (2012.01)
*H04L 9/14* (2006.01)
*H04W 12/06* (2021.01)

(52) U.S. Cl.
CPC ....... *H04L 9/3242* (2013.01); *G06Q 20/3829* (2013.01); *H04L 9/14* (2013.01); *H04L 9/3249* (2013.01); *H04W 12/06* (2013.01); *H04L 2209/56* (2013.01)

(58) Field of Classification Search
CPC ....... H04L 9/3242; H04L 9/14; H04L 9/3249; H04L 2209/56; H04L 9/32; G06Q 20/3829; G06Q 20/38; H04W 12/06
See application file for complete search history.

(56) References Cited

U.S. PATENT DOCUMENTS

| 8,858,313 B1 | 10/2014 | Selfors |
| 9,569,771 B2 | 2/2017 | Esavich et al. |
| 9,722,790 B2 | 8/2017 | Ebrahimi |
| 9,774,578 B1 | 9/2017 | Ateniese et al. |

(Continued)

FOREIGN PATENT DOCUMENTS

| AU | 2016101183 | 9/2016 |
| CN | 105681301 | 6/2016 |

(Continued)

OTHER PUBLICATIONS

Takemiya et al. WIPO PCT Publication WO 2018/088475 A1 (machine translation/partial professional drawing translation) (Year:2016).

(Continued)

*Primary Examiner* — Kaveh Abrishamkar
*Assistant Examiner* — Howard H. Louie
(74) *Attorney, Agent, or Firm* — Fletcher Yoder, PC (57) ABSTRACT

Methods, systems, storage media for authentication are described. On the methods includes receiving, at a smart contract on a distributed ledger, a signed authentication challenge. The method includes verifying the identity of the user who signed authentication challenge. The method includes raising an event that indicates that the user has been authenticated; wherein a server listens for events from the smart contract, and associates a session between the browser and the server with the user based on the event.

20 Claims, 8 Drawing Sheets

(56) References Cited

U.S. PATENT DOCUMENTS

| | | |
|---|---|---|
| 10,721,231 B2 * | 7/2020 | Fan .................. G06Q 20/12 |
| 2009/0210328 A1 | 8/2009 | Fomenko et al. |
| 2014/0059536 A1 | 2/2014 | Hiratsuka et al. |
| 2015/0278820 A1 | 10/2015 | Meadows |
| 2015/0332395 A1 | 11/2015 | Walker et al. |
| 2015/0356524 A1 | 12/2015 | Pennanen |
| 2015/0356555 A1 | 12/2015 | Pennanen |
| 2015/0371224 A1 | 12/2015 | Lingappa |
| 2015/0379510 A1 | 12/2015 | Smith |
| 2016/0162897 A1 | 6/2016 | Feeney |
| 2016/0203477 A1 | 7/2016 | Yang et al. |
| 2016/0253622 A1 | 9/2016 | Sriram et al. |
| 2016/0261411 A1 | 9/2016 | Yau et al. |
| 2016/0314462 A1 | 10/2016 | Hong et al. |
| 2016/0321751 A1 | 11/2016 | Creighton, IV et al. |
| 2016/0330027 A1 | 11/2016 | Ebrahimi |
| 2016/0358165 A1 | 12/2016 | Maxwell |
| 2016/0365978 A1 | 12/2016 | Ganesan et al. |
| 2017/0046651 A1 | 2/2017 | Lin et al. |
| 2017/0053249 A1 | 2/2017 | Tunnell et al. |
| 2017/0076280 A1 | 3/2017 | Castinado et al. |
| 2017/0076286 A1 | 3/2017 | Castinado et al. |
| 2017/0078299 A1 | 3/2017 | Castinado et al. |
| 2017/0103391 A1 | 4/2017 | Wilson, Jr. et al. |
| 2017/0109748 A1 | 4/2017 | Kote |
| 2017/0140375 A1 | 5/2017 | Kunstel |
| 2017/0155515 A1 | 6/2017 | Androulaki et al. |
| 2017/0171187 A1 | 6/2017 | Yin et al. |
| 2017/0177898 A1 | 6/2017 | Pillenberger |
| 2017/0206382 A1 | 7/2017 | Rodriguez De Castro et al. |
| 2017/0228704 A1 | 8/2017 | Zhou et al. |
| 2017/0230375 A1 | 8/2017 | Kurian |
| 2017/0232300 A1 | 8/2017 | Tran et al. |
| 2017/0244707 A1 | 8/2017 | Johnsrud et al. |
| 2017/0250972 A1 | 8/2017 | Ronda et al. |
| 2017/0278186 A1 | 9/2017 | Creighton, IV et al. |
| 2017/0279801 A1 | 9/2017 | Andrade |
| 2017/0287068 A1 | 10/2017 | Nugent |
| 2017/0289111 A1 | 10/2017 | Voell et al. |
| 2017/0295157 A1 * | 10/2017 | Chavez .................. H04L 9/3239 |
| 2017/0317997 A1 * | 11/2017 | Smith .................. H04L 9/14 |
| 2018/0253539 A1 | 9/2018 | Minter et al. |
| 2018/0255090 A1 * | 9/2018 | Kozloski .................. H04L 67/02 |

FOREIGN PATENT DOCUMENTS

| | | |
|---|---|---|
| CN | 106230808 | 12/2016 |
| CN | 106230852 | 12/2016 |
| CN | 106408299 | 2/2017 |
| CN | 106484836 | 3/2017 |
| CN | 106504091 | 3/2017 |
| KR | 101590076 | 2/2016 |
| KR | 101591244 | 2/2016 |
| KR | 20160150278 | 12/2016 |
| KR | 101762245 | 7/2017 |
| KR | 101773073 | 8/2017 |
| KR | 101773074 | 8/2017 |
| KR | 101780636 | 9/2017 |
| WO | 2016036969 | 3/2016 |
| WO | 2017006134 | 1/2017 |
| WO | 2017006135 | 1/2017 |
| WO | 2017006136 | 1/2017 |
| WO | 2017021154 | 2/2017 |
| WO | 2017044554 | 3/2017 |
| WO | 2017066715 | 4/2017 |
| WO | 2017079795 | 5/2017 |
| WO | 2017091530 | 6/2017 |
| WO | 2017104899 | 6/2017 |
| WO | 2017119564 | 7/2017 |
| WO | 2017136956 | 8/2017 |
| WO | 2017139688 | 8/2017 |
| WO | 2017146333 | 8/2017 |
| WO | 2018088475 | 5/2018 |

OTHER PUBLICATIONS

Takemiya et al. WIPO PCT Publication WO 2018/088475A1 (Year: 2016).

Abeyratne, Saveen A; Monfared, Radmehr (2016): Blockchain ready manufacturing supply chain using distributed ledger. Loughborough University. Journal contribution. https://hdl.handle.net/2134/22625 (Year: 2016).

* cited by examiner

PKI-BASED USER AUTHENTICATION FOR WEB SERVICES USING BLOCKCHAIN

CROSS-REFERENCE

This application is a continuation of U.S. application Ser. No. 17/068,361, entitled "PKI-BASED USER AUTHENTICATION FOR WEB SERVICES USING BLOCKCHAIN," filed Oct. 12, 2020, which is a continuation of U.S. application Ser. No. 15/685,712, entitled "PKI-BASED USER AUTHENTICATION FOR WEB SERVICES USING BLOCKCHAIN," filed Aug. 24, 2017, now U.S. Pat. No. 10,805,085, which are hereby incorporated by reference in their entireties for all purposes.

BACKGROUND

In computer science, authentication refers to the process of confirming the identity of an individual or thing. The ways in which the identity of a person may be authenticated fall into three categories, based on what are known as the factors of authentication: something the user knows, something the user has, and something the user is. Each authentication factor covers a range of elements used to authenticate or verify a person's identity prior to being granted access, approving a transaction request, signing a document or other work product, granting authority to others, and establishing a chain of authority.

SUMMARY

Implementations of the present disclosure are directed to securing network identity and providing for a more efficient and secure login system.

In general, innovative aspects of the subject matter described in this specification can be embodied in methods that includes actions of receiving, at a smart contract on a distributed ledger, a signed authentication challenge, verifying the identity of the user who signed authentication challenge, and raising an event that indicates that the user has been authenticated; wherein a server listens for events from the smart contract, and associates a session between the web browser and the server with the user based on the event.

Implementations can optionally include one or more of the following features. The methods may include adding an entry to the distributed ledger, the entry indicating that the user has been authenticated. The server may provide a code to a computer of the user, a mobile device may include the code in the signed authentication challenge, and the smart contract may include the code in the event. The code may be provided to the computer as part of a quick response code and the mobile device obtains the code through a camera. The same cryptographic key may be used to authenticate the user to a plurality of servers.

Other implementations of any of the above aspects include corresponding systems, apparatus, and computer programs that are configured to perform the actions of the methods, encoded on computer storage devices. The present disclosure also provides a computer-readable storage medium coupled to one or more processors and having instructions stored thereon which, when executed by the one or more processors, cause the one or more processors to perform operations in accordance with implementations of the methods provided herein. The present disclosure further provides a system for implementing the methods provided herein. The system includes one or more processors, and a computer-readable storage medium coupled to the one or more processors having instructions stored thereon which, when executed by the one or more processors, cause the one or more processors to perform operations in accordance with implementations of the methods provided herein.

Implementations of the present disclosure provide one or more of the following advantages. Users may be able to authenticate with multiple servers using the same credentials. Managing the login process may be improved. Computer security may be improved.

It is appreciated that aspects and features in accordance with the present disclosure can include any combination of the aspects and features described herein. That is, aspects and features in accordance with the present disclosure are not limited to the combinations of aspects and features specifically described herein, but also include any combination of the aspects and features provided.

The details of one or more implementations of the present disclosure are set forth in the accompanying drawings and the description below. Other features and advantages of the present disclosure will be apparent from the description and drawings, and from the claims.

DETAILED DESCRIPTION

The most prevalent form of user authentication on the web is password-based authentication. This is insecure in many aspects: 1) because the secret—in this case the password—is sent over the network to the server, it is susceptible to theft by key loggers, network sniffing/intercept and phishing via fake websites set up to steal the user's credentials (username and password). 2) user credentials (username and password or a hash of password) for a website are centrally stored by the server of the website to authenticate users. This creates a "honey pot" for hackers to breach one system and obtain massive number of user credentials stored in that system. 3) as users subscribe to more and more services, one of the major challenges is that users are expected to remember an ever-growing list of usernames and passwords. This leads some users to choose poor passwords or to use the same password on multiple sites. If one site is compromised by the attack described in 2), any other sites using the same password is also compromised. Implementations of the present disclosure are directed to systems, devices, methods, and computer-readable media for securing network identity and providing for a more efficient and secure login system.

Using Public Key Cryptography as a basis for user authentication has many advantages. Sensitive information, the private key, is generally not transmitted anywhere and is thus not susceptible to the theft channels described above. These private keys are stored in a decentralized manner on individual user's personal devices that are at the edge of the network, avoiding the creation of "honey pot" of user credentials. Reusing the same credential (public-private key pair) also does not lead to increased security risk. Blockchain and distributed ledger technologies that use Public Key Cryptography to secure transactions are inherently a Public Key infrastructure, and can be used to implement Public Key based authentication for web services.

To provide some basic context into blockchain technologies, in general, a blockchain is a public or private ledger of all transactions that have been executed in one or more contexts (e.g., negotiable instrument transactions, digital currency transactions, access determinations, instances of providing access, calls to a call center, customer service reps signing into a call center etc.). A blockchain can grow as completed blocks are added with a new set of transactions. In some examples, a single block is provided from multiple transactions (e.g., multiple callers into a call center). In general, blocks are added to the blockchain in a linear, chronological order by one or more computing devices in a peer-to-peer network of interconnected computing devices that execute a blockchain protocol. In short, the peer-to-peer network can be described as a plurality of interconnected nodes, each node being a computing device that uses a client to validate and relay transactions. Each node maintains a copy of the blockchain ledger, which is automatically downloaded to the node upon joining the peer-to-peer network. The blockchain protocol provides a secure and reliable method of updating the blockchain, copies of which are distributed across the peer-to-peer network, without use of a central authority.

Because all entities on the blockchain network know all previous transactions to validate a requested transaction, all entities must agree on which transactions have actually occurred, and in which order. For example, if two entities observe different transaction histories, they will be unable to come to the same conclusion regarding the validity of a transaction. The blockchain enables all entities to come to an agreement as to transactions that have already occurred, and in which order. In short, and as described in further detail below, a ledger of transactions is agreed to based on the amount of work required to add a transaction to the ledger of transactions (e.g., add a block to the blockchain) using Proof of Work (PoW) consensus protocol. In this context, the work is a task that is difficult for any single node (e.g., computing device) in the peer-to-peer network to quickly complete, but is relatively easy for a node (e.g., computing device) to verify. Blockchains can also employ other protocols for concensus (for example, Proof of Stake (POS), or Byzantine Fault Tolerant).

For PoW blockchains, the peer-to-peer network includes so-called miners (e.g., computing devices) that add blocks to a blockchain based on the blockchain protocol. In general, multiple miners validate transactions that are to be added to a block, and compete (e.g., perform work, as introduced above) to have their block added to the blockchain. A blockchain protocol includes a proof of work scheme that is based on a cryptographic hash function (CHF). An example CHF includes the secure hash algorithm 256 (SHA-256). In general, the CHF receives information as input, and provides a hash value as output, the hash value being of a predetermined length. For example, SHA-256 outputs a 256-bit (32-byte, 64-character) hash value. In some examples, the hash value is a one-way hash value, in that the hash value cannot be 'un-hashed' to determine what the input was. The blockchain protocol can require multiple pieces of information as input to the CHF. For example, the input to the CHF can include a reference to the previous (most recent) block in the blockchain, details of the transaction(s) that are to be included in the to be created block, and a nonce value (e.g., a random number used only once).

For PoW blockchains, multiple nodes can compete to hash a set of transactions and provide the next block that is to be added to the blockchain. The blockchain protocol provides a threshold hash to qualify a block to be added to the blockchain. For example, the threshold hash can include a predefined number of zeros (0's) that the hash value must have at the beginning (e.g., at least the first four characters of the hash value must each be zero). The higher the number of zeros, the more time-consuming it is to arrive at a qualifying hash value.

For PoW blockchains, in accordance with the blockchain protocol, each miner in the peer-to-peer network receives transaction information for one or more transactions that are to be included in a block that is to be added next in the blockchain. Each miner provides the reference to the previous (most recent) block in the blockchain, details of the transaction(s) that are to be included in the to-be-created block, and the nonce value to the CHF to provide a hash value. If the hash value does not meet the threshold hash (e.g., the first four characters of the hash value are not each zero), the miner starts again to provide another hash value. If the hash value meets the threshold hash (e.g., at least the first four characters of the hash value are each zero), the respective miner successfully created the next block that is to be added to the blockchain. Consequently, the respective miner's block is broadcast across the peer-to-peer network. All other miners cease work (because one miner was already successful), and all copies of the blockchain are updated across the peer-to-peer network to append the block to the blockchain. Each miner can be required to produce hundreds or thousands of hash values, before any one miner provides a qualifying hash value (e.g., at least the first four characters of the hash value are each zero).

Some blockchain services support smart contracts. For example, by enabling the smart contract code to execute in a virtual machine. Generally, smart contracts are deterministic exchange mechanisms controlled by a computer system that can carry out the direct transaction of value between untrusted agents. Smart contracts can facilitate, verify, and enforce the negotiation or performance of procedural instructions. Smart contracts can vary from standalone scripts to decentralized application that maintain state. Smart contracts can be stored in a blockchain. Smart contracts can be accessed using a blockchain address.

Using smart contracts, a system can use a blockchain's strong ownership and identity information in order to provide a secure and easy to use user authentication experience.

In a blockchain, the user's identity is determined based on a public/private key pair. As in other Public Key Infrastructure (PKI) systems, the private key can be used the decrypt messages encrypted using the public key and the public key can be used to verify the signature of items signed using the private key. As such, ownership of an identity generally cannot to be confiscated or usurped. A user can prove their blockchain identity by signing a statement using their private key. Every transaction on the blockchain is signed with the private key of the sender and validated by nodes on the blockchain network using the corresponding public key. The fact that a transaction's signature checks out implicitly confirms the sender's identity (aka, the sender owns the private key behind the sender's identity on the blockchain).

The private key does not have to be transmitted over a network or otherwise exposed. Only the user's public key is required to verify a signature. Private keys are generally only stored on user devices, and are not generally available on the network.

Figure 1:
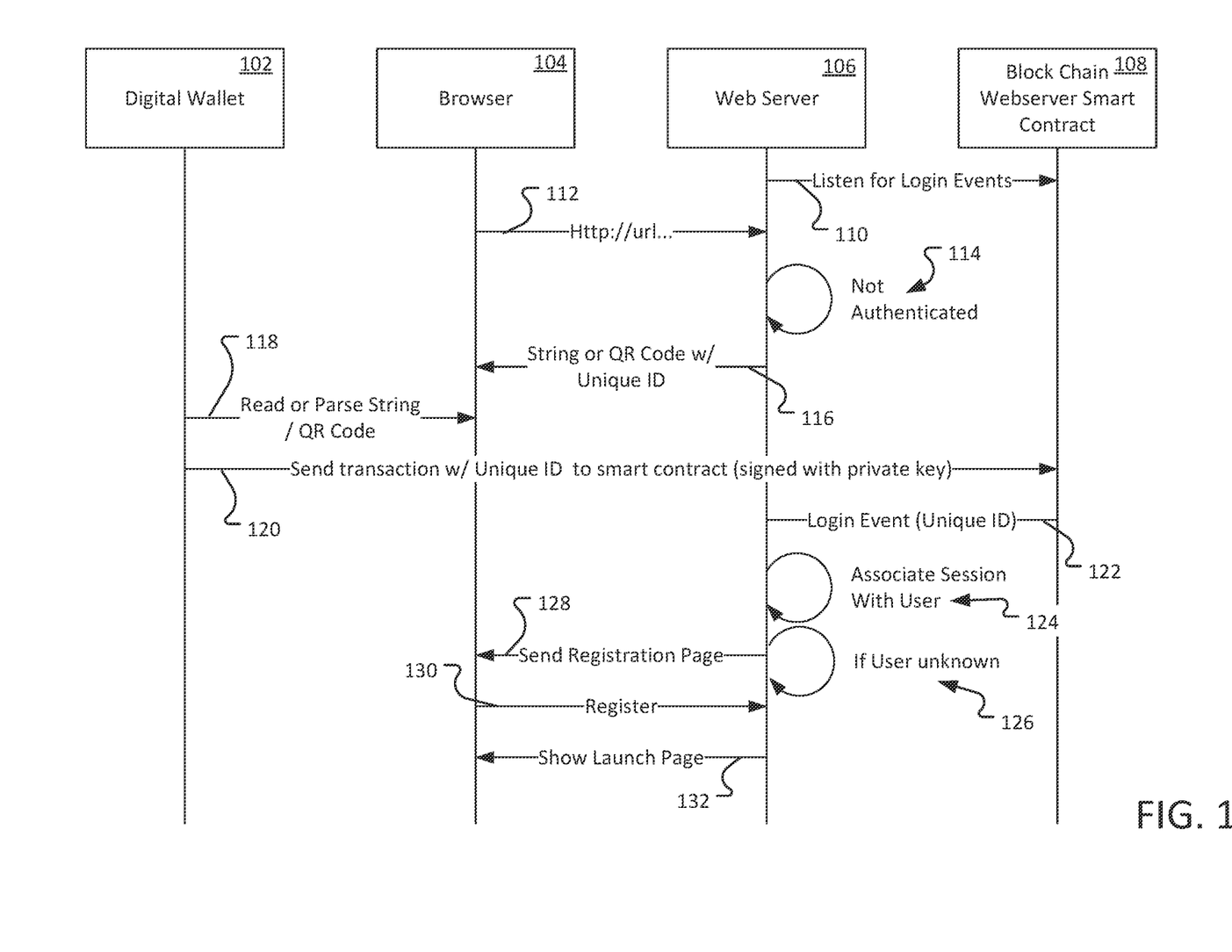
FIG. 1 illustrates a sequence diagram illustrating an example process for authenticating a user based on blockchain authentication.

FIG. 1 illustrates a sequence diagram illustrating an example process for authenticating a user based on blockchain transactions. A webserver 106 (or other resource responsible for authenticating users for a website or other application) listens 110 for login events from a smart contract on a blockchain 108. In general, the smart contract on the blockchain facilitates user authentication with a web server and may be dedicated to a webserver or organization. For example, one website may have a smart contract on the blockchain while another website may have a separate smart contract on the blockchain, for user authentication purposes. When the smart contract receives a transaction with a valid signature from a user, the smart contract raises a login event. The login event may be signals provided by the smart contract. Events may be processed in near real time (the listener watches the blockchain for events) or may be processed in batches (the listener periodically obtains all the events that have occurred since the last time the listener checked and process them).

A user who wishes to access the website directs his browser 104 to a particular uniform resource locator (URL) 112. The request is received by a webserver 106. The webserver 106 determines that the user associated with the browser session has not been authenticated 114. Accordingly the webserver 106 provides 116 a webpage that includes a string, QR Code, bar code, or other mechanism to direct the user to the smart contract to sign in using a key pair in her digital wallet. The string, QR Code, bar code, or other mechanism includes a unique identifier to identify this access session 112 between browser 104 and web server 106.

Figure 2:
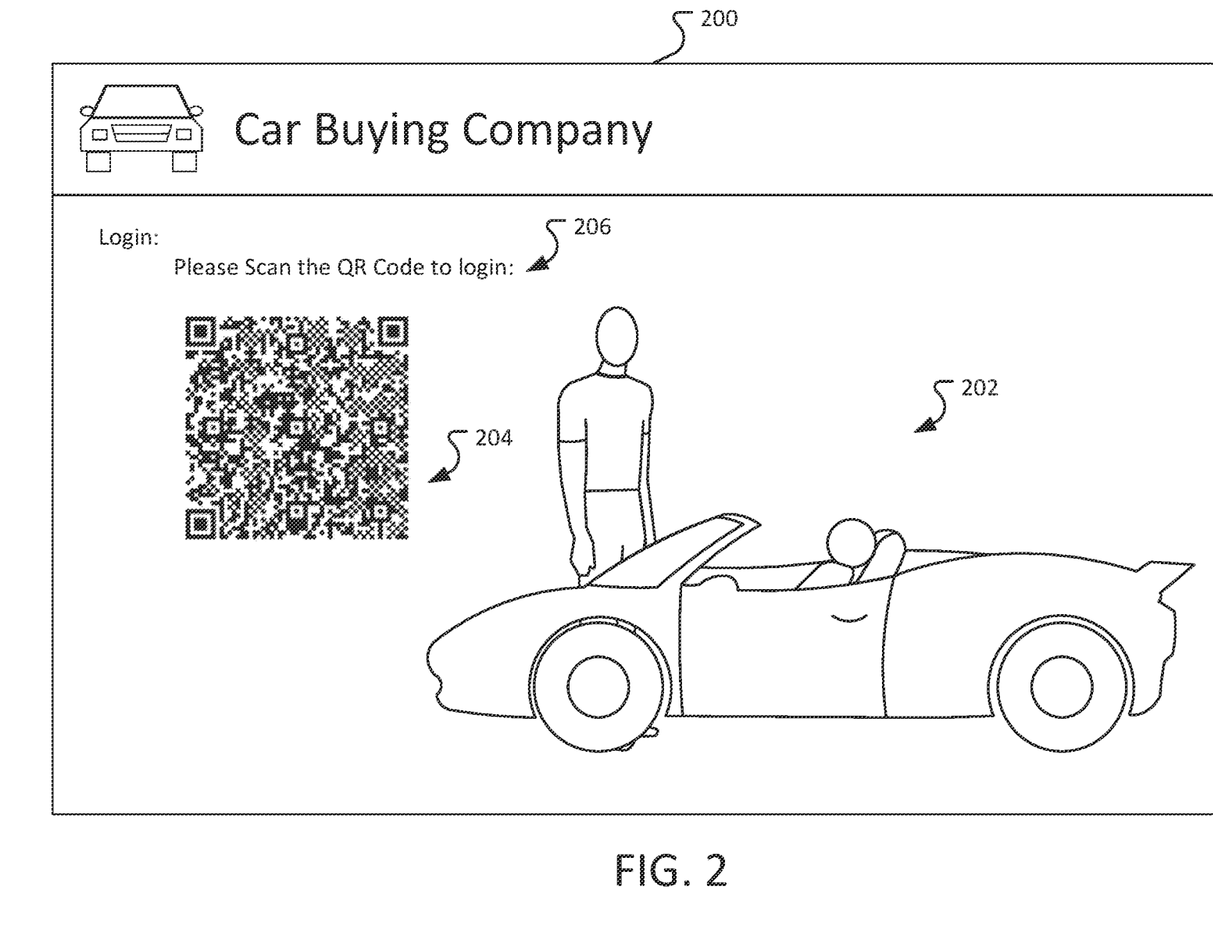
FIG. 2 illustrates an example of a login page provided by a webserver.

FIG. 2 illustrates an example of a login page provided by a webserver. In this example, the webpage 200 is a car buying company. The user is presented with the web page that can include sufficient iconography and branding information 202 to let the user know that he is at the correct website.

The webpage also includes a QR code 204. The QR code contains information that can be used by a digital wallet or similar application in order to contact the smart contract for the website. The webpage 200 also requests 206 that the user scans the QR code in order to login.

Returning to FIG. 1, the user reads 118 or parses the string or QR code using a digital wallet 102 or similar application. The digital wallet 102 or similar application can be executing on a mobile device or other personal computing devices of the user.

Figure 3A:
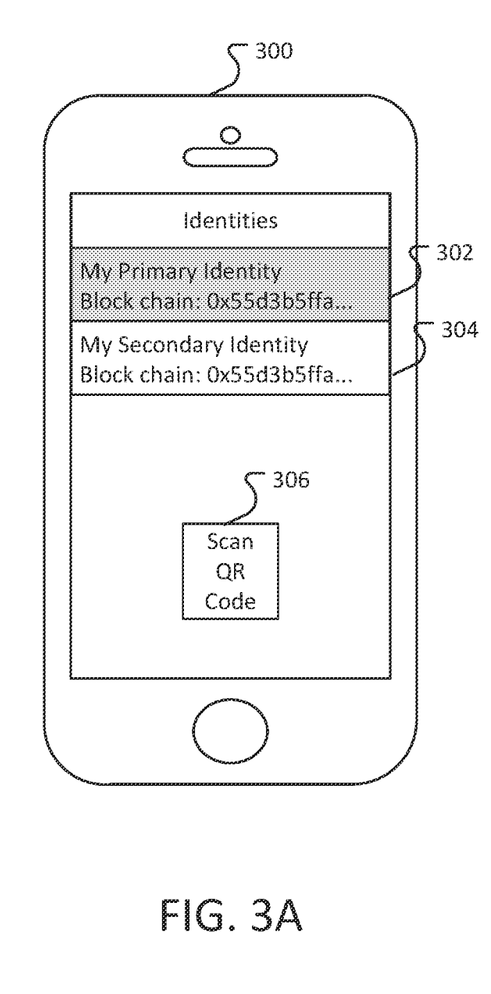
FIGS. 3A-3C illustrates examples of a digital wallet parsing a QR code on a website.
Figure 3B:
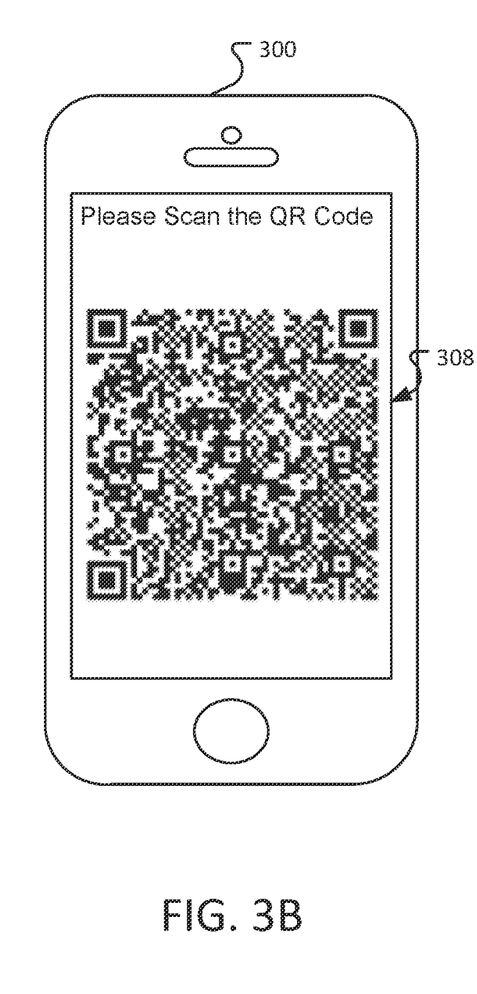
Figure 3C:
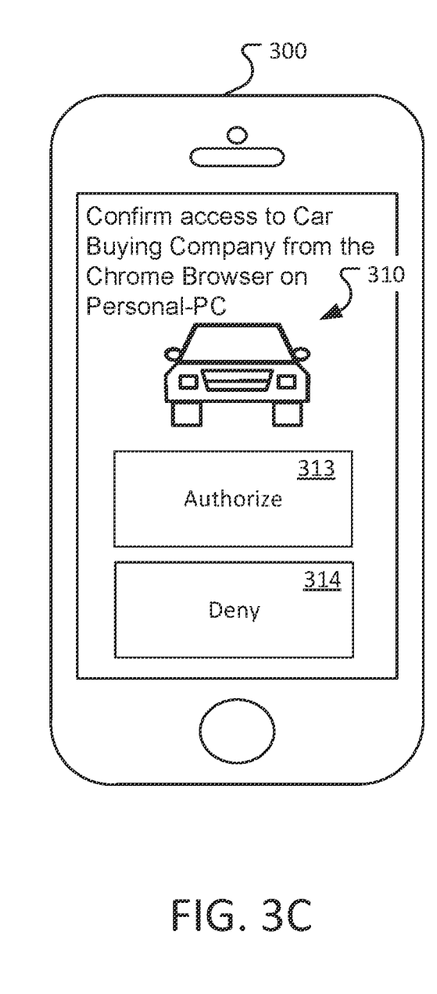

FIGS. 3A-3C illustrates examples of a digital wallet on a mobile device parsing a QR code on a website. As shown in FIG. 3A, a mobile device 300 includes a digital wallet. The user is able to select between multiple different identities (primary identity 302 and secondary identity 304). In this example, the user selects the primary identity 302. Each identity is associated with a private and public key. The wallet stores the private key, for example, the wallet may store the private key in a secure section of memory.

The user is given the option to scan a QR code 306.

FIG. 3B illustrates an example application after the user has selected to scan a QR code. When the user selects to scan a QR code, the digital wallet accesses a camera on the mobile device 300 to enable the user to scan the QR code 308 being displayed on the webpage (for example, the web page 200 of FIG. 2). The string/QR code may include a unique identifier that can be used to identify the session between the browser 104 and the webserver 106.

The digital wallet parses the information included in the QR Code and asks the user if they wish to authenticate for the session between the browser 104 and the webserver, as shown in FIG. 3C. The information may provide information about the webserver or service with which the user is authenticating (310) as well as information that identifies where the user is logging in. For example, in this case the browser 104 the user is using to accesse the website is a CHROME web browser on a personal computer named "Personal-PC".

The user can decide, based on the information provided, whether to authorize 313 or deny 314 the browser 104's access to the website.

Referring back to FIG. 1, if the user agrees to allow the browser 104 to login to the webserver, the digital wallet sends a message including the unique identifier for the session, and the identity of the user to the smart contract 108. The digital wallet signs the message using the private key of the selected identity.

The smart contract 108 verifies the digital signature. Verifying the message from the digital wallet includes verifying that the selected identity signed the message (for example, by using the public key associated with the user).

Once the smart contract verifies that the user's selected identity signed the message, the smart contract 108 raises a login event. The login event may include the unique ID that is used to identify the session and an identifier that is used to identify the user. In some implementations, the identifier may be a hash of the user's public key.

Figure 4:
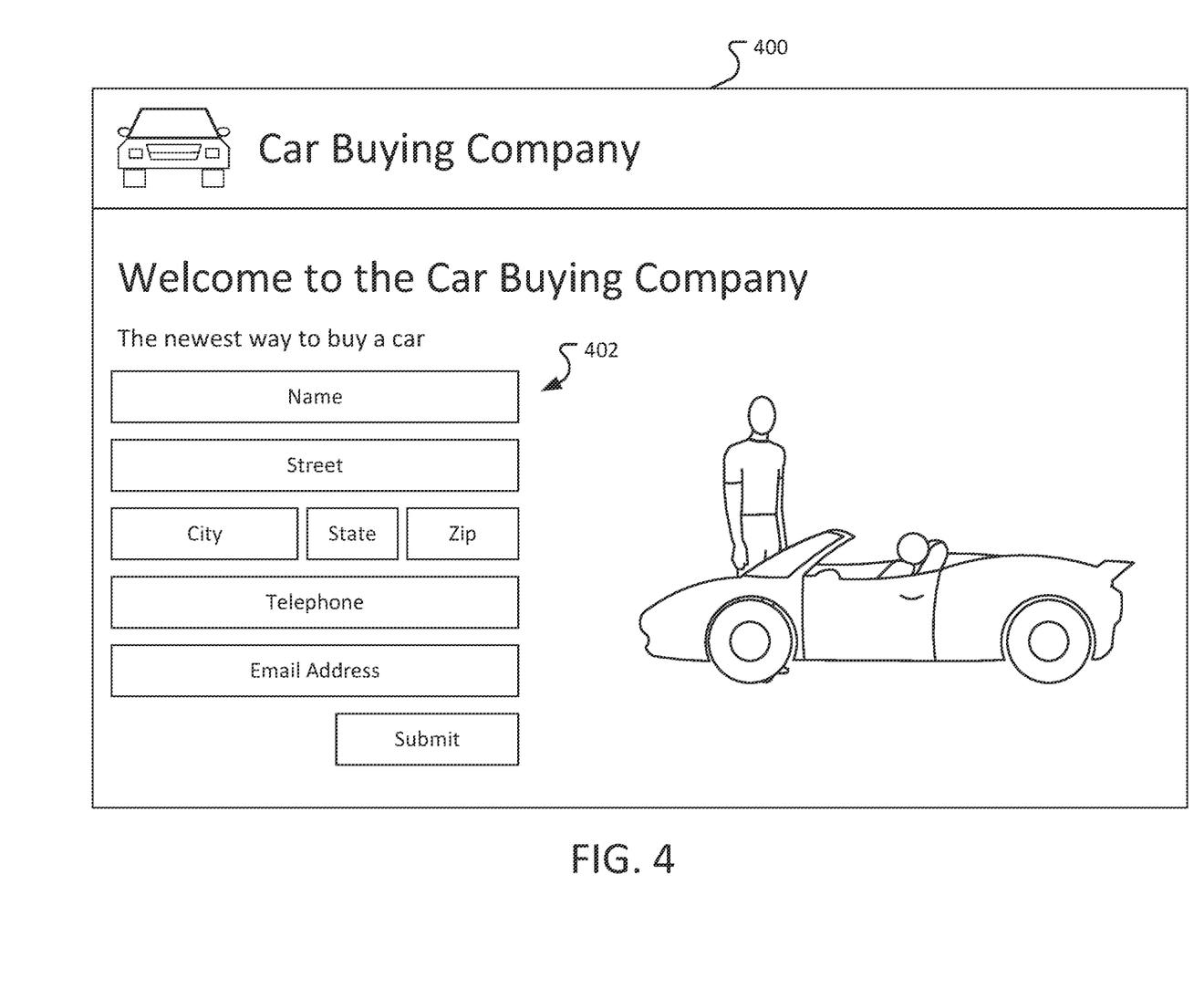
FIG. 4 illustrates an example of a registration page.

When the webserver 106 receives the login event, the webserver 106 associates the session identified by the unique ID with the user identified by the identifier. If the user is unknown 126 (that is the webserver 106 does not have a previous record associated with the user), then the webserver can send the user to a registration page 128. An example of a registration page is illustrated in FIG. 4. The registration page 400 asks the user to fill out information 402. Referring back to FIG. 1, when the registration page is submitted and the user registers 130, the information can be stored and associated with the user identifier.

Figure 5:
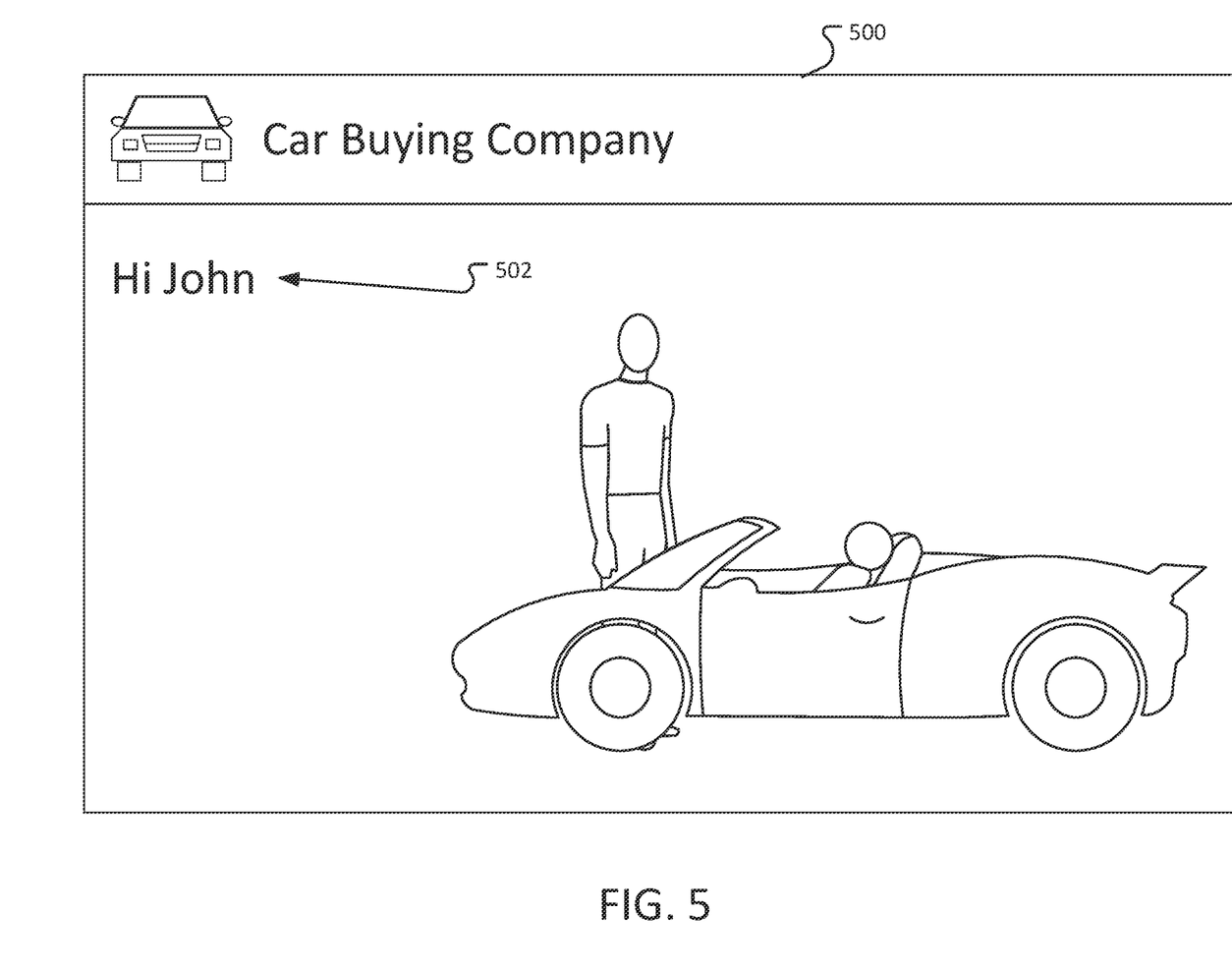
FIG. 5 illustrates an example of a personalized launch page that includes information about the user.

Once the user is registered or if the webserver 106 already has information associated with the user identifier (that is, if the user is not unknown at step 126), then the webserver 106 can provide 132 the user with a personalized launch page. For example, FIG. 5 illustrates an example of a personalized launch page 500 that includes information about the user 502 (in this example, the user's name). Other information about the user can also be stored and presented, for example, user preferences, order history, account information, etc.

Figure 6:
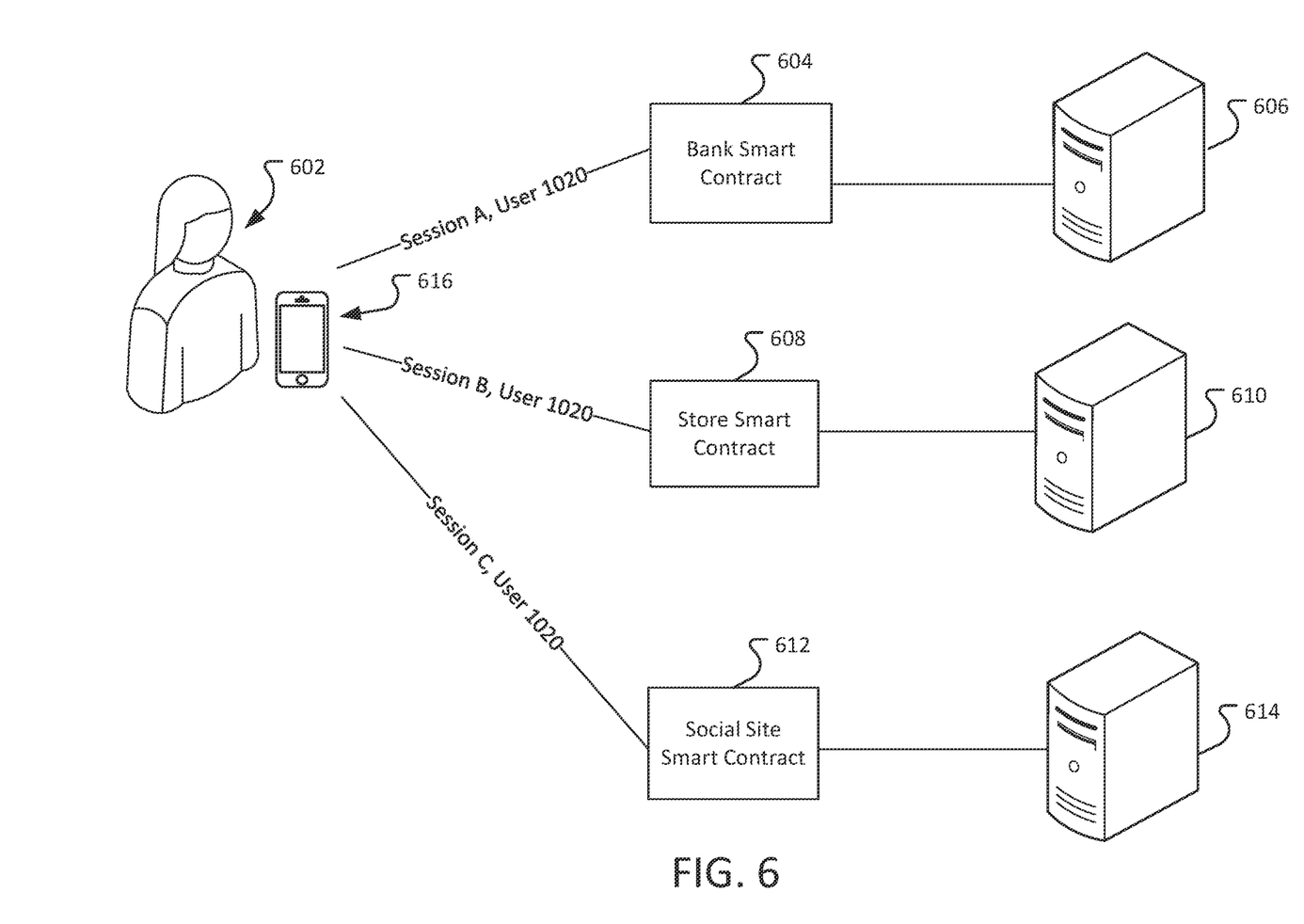
FIG. 6 illustrates an example of a user using the same blockchain identity to log into multiple different servers.

A user can choose to use different identities in her digital wallet to log into different servers, or reuse the same identity for different servers. FIG. 6 illustrates an example of a user 602 using the same blockchain identity to log into multiple different servers.

The user 602 used a digital wallet on her device 616 and the same blockchain identity 1020 in that wallet to authenticate with a bank smart contract 604, a store smart contract 608, and a social site smart contract 612. Each smart contract is associated with a different server (for example, the bank smart contract 604 is associates with the server 606, the store smart contract is associated with the server 610, and the social site smart contract is associated with the server 614. In this example, the user's digital wallet app provides the user identity 1020 and a session ID to each smart contract, however, in some implementations, the smart contracts and/or services associated with the smart contracts can dictate a portion of what the user sends. For example, the digital wallet may always send a user ID and may also send some pass through information (in this example, the session ID) that the service can use to identify the session to be authenticated.

While each server may know the user as user 1020, the specific additional information that each server knows about the user 602 may vary based on the business and the information that the user 602 elects to disclose. For example, the server 606 may know about the user's bank account but not the user's purchase habits, while the server 610 may know about the user's purchase habits but not the user's bank information. If the user uses different identities for the different servers, the different servers 606 and 610 cannot correlate what each of them knows about the user as belonging to the same person through collusion.

Figure 7:
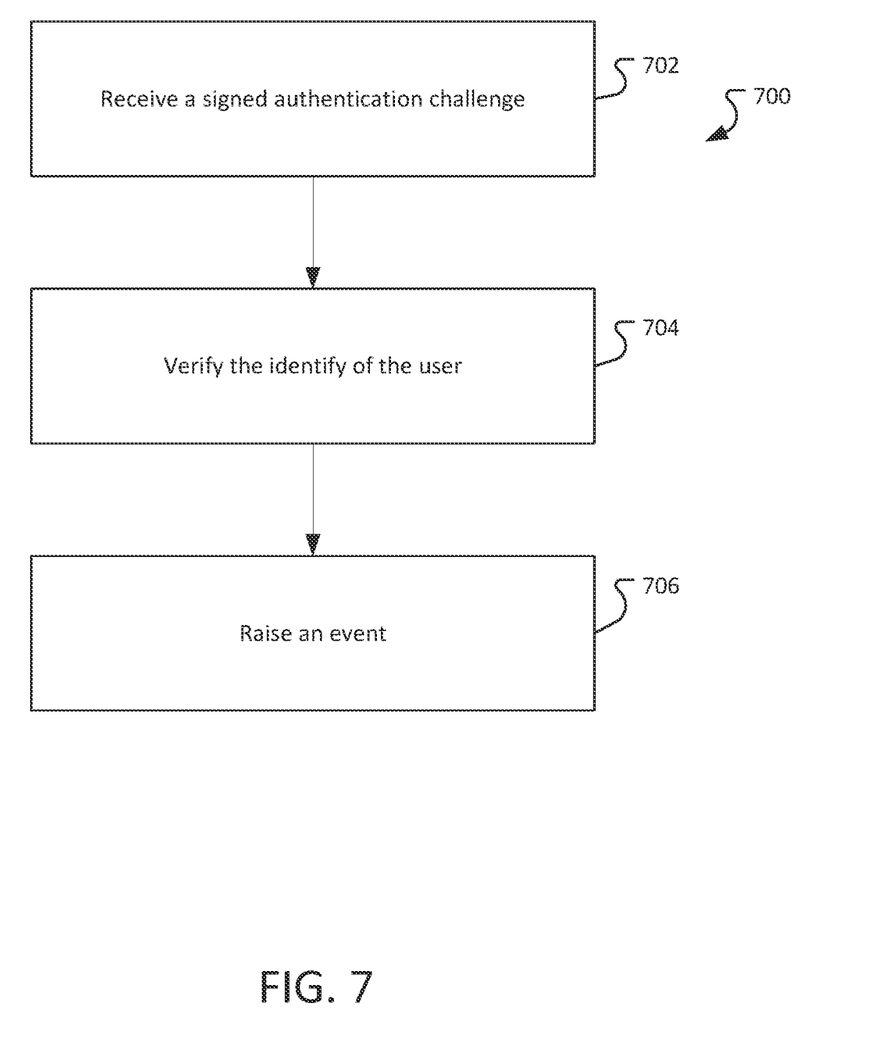
FIG. 7 illustrates an example process for authenticating a user using a distributed ledger.

FIG. 7 illustrates an example process for authenticating a user using a distributed ledger as the Public Key Infrastructure.

The process 700 receives 702 a signed authentication challenge. For example, a mobile device may send a signed authentication challenge to a smart contract. The smart contract may be located on or associated with a distributed ledger system.

The process 702 verifies 704 the identity of the user who signed authentication challenge. For example, the challenge statement may have been cryptographically signed using a private key associated with the user. The system can verify that the challenge was signed by the user, using the user's public key.

The process 700 raises 706 an event that indicates that the user has been authenticated. In some implementations, a server listens for events from the smart contract, and associates a session between the browser and the server with the user based on the event.

Figure 8:
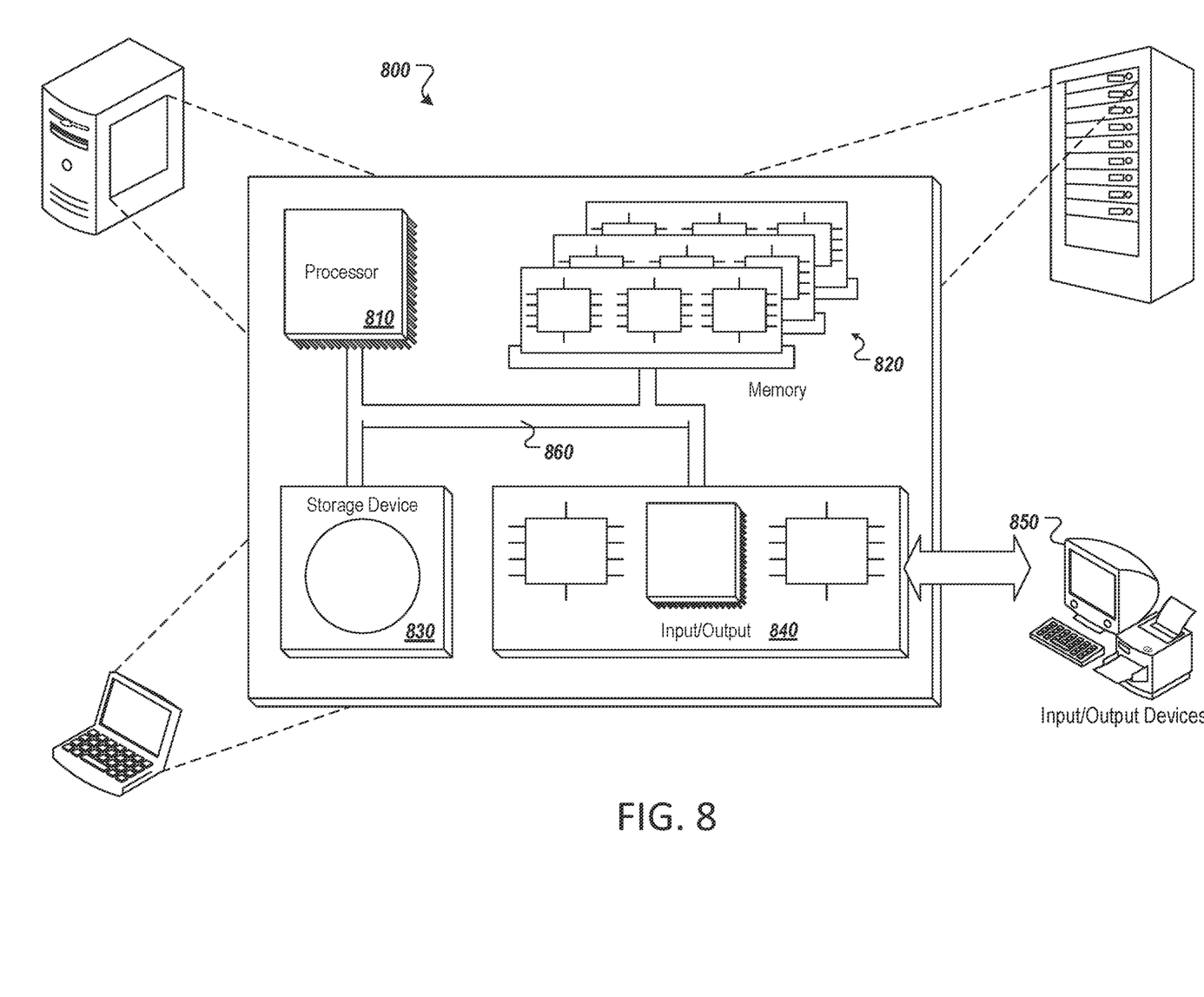
FIG. 8 depicts an example computing system, according to implementations of the present disclosure.

FIG. 8 depicts an example computing system, according to implementations of the present disclosure. The system 800 may be used for any of the operations described with respect to the various implementations discussed herein. The system 800 may include one or more processors 810, a memory 820, one or more storage devices 830, and one or more input/output (I/O) devices 850 controllable through one or more I/O interfaces 840. The various components 810, 820, 830, 840, or 850 may be interconnected through at least one system bus 860, which may enable the transfer of data between the various modules and components of the system 800.

The processor(s) 810 may be configured to process instructions for execution within the system 800. The processor(s) 810 may include single-threaded processor(s), multi-threaded processor(s), or both. The processor(s) 810 may be configured to process instructions stored in the memory 820 or on the storage device(s) 830. The processor(s) 810 may include hardware-based processor(s) each including one or more cores. The processor(s) 810 may include general purpose processor(s), special purpose processor(s), or both.

The memory 820 may store information within the system 800. In some implementations, the memory 820 includes one or more computer-readable media. The memory 820 may include any number of volatile memory units, any number of non-volatile memory units, or both volatile and non-volatile memory units. The memory 820 may include read-only memory, random access memory, or both. In some examples, the memory 820 may be employed as active or physical memory by one or more executing software modules.

The storage device(s) 830 may be configured to provide (e.g., persistent) mass storage for the system 800. In some implementations, the storage device(s) 830 may include one or more computer-readable media. For example, the storage device(s) 830 may include a floppy disk device, a hard disk device, an optical disk device, or a tape device. The storage device(s) 830 may include read-only memory, random access memory, or both. The storage device(s) 830 may include one or more of an internal hard drive, an external hard drive, or a removable drive.

One or both of the memory 820 or the storage device(s) 830 may include one or more computer-readable storage media (CRSM). The CRSM may include one or more of an electronic storage medium, a magnetic storage medium, an optical storage medium, a magneto-optical storage medium, a quantum storage medium, a mechanical computer storage medium, and so forth. The CRSM may provide storage of computer-readable instructions describing data structures, processes, applications, programs, other modules, or other data for the operation of the system 800. In some implementations, the CRSM may include a data store that provides storage of computer-readable instructions or other information in a non-transitory format. The CRSM may be incorporated into the system 800 or may be external with respect to the system 800. The CRSM may include read-only memory, random access memory, or both. One or more CRSM suitable for tangibly embodying computer program instructions and data may include any type of non-volatile memory, including but not limited to: semiconductor memory devices, such as EPROM, EEPROM, and flash memory devices; magnetic disks such as internal hard disks and removable disks; magneto-optical disks; and CD-ROM and DVD-ROM disks. In some examples, the processor(s) 810 and the memory 820 may be supplemented by, or incorporated into, one or more application-specific integrated circuits (ASICs).

The system 800 may include one or more I/O devices 850. The I/O device(s) 850 may include one or more input devices such as a keyboard, a mouse, a pen, a game controller, a touch input device, an audio input device (e.g., a microphone), a gestural input device, a haptic input device, an image or video capture device (e.g., a camera), or other devices. In some examples, the I/O device(s) 850 may also include one or more output devices such as a display, LED(s), an audio output device (e.g., a speaker), a printer, a haptic output device, and so forth. The I/O device(s) 850 may be physically incorporated in one or more computing devices of the system 800, or may be external with respect to one or more computing devices of the system 800.

The system 800 may include one or more I/O interfaces 840 to enable components or modules of the system 800 to control, interface with, or otherwise communicate with the I/O device(s) 850. The I/O interface(s) 840 may enable information to be transferred in or out of the system 800, or between components of the system 800, through serial communication, parallel communication, or other types of communication. For example, the I/O interface(s) 840 may comply with a version of the RS-232 standard for serial ports, or with a version of the IEEE 1284 standard for parallel ports. As another example, the I/O interface(s) 840 may be configured to provide a connection over Universal Serial Bus (USB) or Ethernet. In some examples, the I/O interface(s) 840 may be configured to provide a serial connection that is compliant with a version of the IEEE 1394 standard.

The I/O interface(s) 840 may also include one or more network interfaces that enable communications between computing devices in the system 800, or between the system 800 and other network-connected computing systems. The network interface(s) may include one or more network interface controllers (NICs) or other types of transceiver devices configured to send and receive communications over one or more networks using any network protocol.

Computing devices of the system 800 may communicate with one another, or with other computing devices, using one or more networks. Such networks may include public networks such as the internet, private networks such as an institutional or personal intranet, or any combination of private and public networks. The networks may include any type of wired or wireless network, including but not limited to local area networks (LANs), wide area networks (WANs), wireless WANs (WWANs), wireless LANs (WLANs), mobile communications networks (e.g., 3G, 4G, Edge, etc.), and so forth. In some implementations, the communications between computing devices may be encrypted or otherwise secured. For example, communications may employ one or more public or private cryptographic keys, ciphers, digital certificates, or other credentials supported by a security protocol, such as any version of the Secure Sockets Layer (SSL) or the Transport Layer Security (TLS) protocol.

The system 800 may include any number of computing devices of any type. The computing device(s) may include, but are not limited to: a personal computer, a smartphone, a tablet computer, a wearable computer, an implanted computer, a mobile gaming device, an electronic book reader, an automotive computer, a desktop computer, a laptop computer, a notebook computer, a game console, a home entertainment device, a network computer, a server computer, a mainframe computer, a distributed computing device (e.g., a cloud computing device), a microcomputer, a system on a chip (SoC), a system in a package (SiP), and so forth. Although examples herein may describe computing device(s) as physical device(s), implementations are not so limited. In some examples, a computing device may include one or more of a virtual computing environment, a hypervisor, an emulation, or a virtual machine executing on one or more physical computing devices. In some examples, two or more computing devices may include a cluster, cloud, farm, or other grouping of multiple devices that coordinate operations to provide load balancing, failover support, parallel processing capabilities, shared storage resources, shared networking capabilities, or other aspects.

Implementations and all of the functional operations described in this specification may be realized in digital electronic circuitry, or in computer software, firmware, or hardware, including the structures disclosed in this specification and their structural equivalents, or in combinations of one or more of them. Implementations may be realized as one or more computer program products, i.e., one or more modules of computer program instructions encoded on a computer readable medium for execution by, or to control the operation of, data processing apparatus. The computer readable medium may be a machine-readable storage device, a machine-readable storage substrate, a memory device, a composition of matter effecting a machine-readable propagated signal, or a combination of one or more of them. The term "computing system" encompasses all apparatus, devices, and machines for processing data, including by way of example a programmable processor, a computer, or multiple processors or computers. The apparatus may include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal that is generated to encode information for transmission to suitable receiver apparatus.

A computer program (also known as a program, software, software application, script, or code) may be written in any appropriate form of programming language, including compiled or interpreted languages, and it may be deployed in any appropriate form, including as a standalone program or as a module, component, subroutine, or other unit suitable for use in a computing environment. A computer program does not necessarily correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one computer or on multiple computers that are located at one site or distributed across multiple sites and interconnected by a communication network.

The processes and logic flows described in this specification may be performed by one or more programmable processors executing one or more computer programs to perform functions by operating on input data and generating output. The processes and logic flows may also be performed by, and apparatus may also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any appropriate kind of digital computer. Generally, a processor may receive instructions and data from a read only memory or a random access memory or both. Elements of a computer can include a processor for performing instructions and one or more memory devices for storing instructions and data. Generally, a computer may also include, or be operatively coupled to receive data from or transfer data to, or both, one or more mass storage devices for storing data, e.g., magnetic, magneto optical disks, or optical disks. However, a computer need not have such devices. Moreover, a computer may be embedded in another device, e.g., a mobile telephone, a personal digital assistant (PDA), a mobile audio player, a Global Positioning System (GPS) receiver, to name just a few. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory may be supplemented by, or incorporated in, special purpose logic circuitry.

To provide for interaction with a user, implementations may be realized on a computer having a display device, e.g., a CRT (cathode ray tube) or LCD (liquid crystal display) monitor, for displaying information to the user and a keyboard and a pointing device, e.g., a mouse or a trackball, by which the user may provide input to the computer. Other kinds of devices may be used to provide for interaction with a user as well; for example, feedback provided to the user may be any appropriate form of sensory feedback, e.g., visual feedback, auditory feedback, or tactile feedback; and input from the user may be received in any appropriate form, including acoustic, speech, or tactile input.

Implementations may be realized in a computing system that includes a back end component, e.g., as a data server, or that includes a middleware component, e.g., an application server, or that includes a front end component, e.g., a client computer having a graphical UI or a web browser through which a user may interact with an implementation, or any appropriate combination of one or more such back end, middleware, or front end components. The components of the system may be interconnected by any appropriate form or medium of digital data communication, e.g., a communication network. Examples of communication networks include a local area network ("LAN") and a wide area network ("WAN"), e.g., the Internet.

The computing system may include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the disclosure or of what may be claimed, but rather as descriptions of features specific to particular implementations. Certain features that are described in this specification in the context of separate implementations may also be implemented in combination in a single implementation. Conversely, various features that are described in the context of a single implementation may also be implemented in multiple implementations separately or in any suitable subcombination. Moreover, although features may be described above as acting in certain combinations and even initially claimed as such, one or more features from a claimed combination may in some examples be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems may generally be integrated together in a single software product or packaged into multiple software products.

A number of implementations have been described. Nevertheless, it will be understood that various modifications may be made without departing from the spirit and scope of the disclosure. For example, various forms of the flows shown above may be used, with steps re-ordered, added, or removed. Accordingly, other implementations are within the scope of the following claims.

The invention claimed is:

1. One or more tangible, non-transitory, computer-readable media having instructions stored thereon that, when executed by processing circuitry, are configured to cause the processing circuitry to perform operations corresponding at least in part to a webserver, the operations comprising:
   receiving an access or transaction request corresponding to a user device of a user;
   enabling a browser session between the webserver and the user device based on the access or transaction request;
   presenting a login page to the user device, the login page having a unique identifier corresponding to the browser session;
   receiving, from the user device, authentication data indicative of the unique identifier and a private key corresponding to the user;
   determining a verification of at least a portion of the authentication data based on a public key corresponding to the user;
   identifying, in response to the verification, a login event published on a smart contract or a distributed ledger, wherein the login event includes first data indicative of an identity of the user and second data indicative of a previous unique identifier corresponding to a previous browser session;
   associating the unique identifier with the identity of the user in response to identifying the login event; and
   granting the access or transaction request in response to associating the unique identifier with the identity of the user.

2. The one or more tangible, non-transitory, computer-readable media of claim 1, the operations further comprising presenting a string, a QR Code, or a bar code in the login page to the user device, wherein the string, the QR code, or the bar code is associated with the unique identifier and accessible by the user device.

3. The one or more tangible, non-transitory, computer-readable media of claim 2, wherein the string, the QR code, or the barcode comprises the unique identifier.

4. The one or more tangible, non-transitory, computer-readable media of claim 1, the operations further comprising granting the access or the transaction request in response to associating the unique identifier with the identity of the user by directing the user device to a personalized launch page corresponding to the webserver.

5. The one or more tangible, non-transitory, computer-readable media of claim 1, the operations further comprising:
   receiving an additional access or transaction request corresponding to the user device of the user;
   enabling an additional browser session between the webserver and the user device;
   presenting an additional login page to the user device, the additional login page having an additional unique identifier;
   receiving, from the user device, additional authentication data indicative of the additional unique identifier and an additional private key corresponding to the user, wherein the additional private key is different than the private key;
   determining an additional verification of at least a portion of the additional authentication data based on an additional public key corresponding to the user, wherein the additional public key is different than the public key;
   identifying, in response to the additional verification, an additional login event published on the smart contract or the distributed ledger in response to the additional verification, wherein the additional login event published on the smart contract or the distributed ledger includes third data indicative of the identity of the user and fourth data indicative of an additional previous unique identifier corresponding to an additional previous browser session;

associating the additional unique identifier with the identity of the user in response to identifying the additional login event; and granting the additional access or transaction request in response to associating the additional unique identifier with the identity of the user.

6. The one or more tangible, non-transitory, computer-readable media of claim 1, the operations further comprising:

identifying a batch of login events including the login event; and identifying an additional batch of login events after a pre-defined time period lapses from identifying the batch of login events.

7. The one or more tangible, non-transitory, computer-readable media of claim 1, wherein the access or transaction request comprises a request to access a secured website or portion thereof.

8. A computer-implemented method, comprising:

receiving, via processing circuitry, an access or transaction request corresponding to a user device of a user;

generating, via the processing circuitry, a browser session between the user device and a webserver;

receiving, via the processing circuitry and from the user device, authentication data indicative of a unique identifier corresponding to the browser session and a private key corresponding to the user;

identifying, via the processing circuitry and in response to a verification of at least a portion of the authentication data based on a public key corresponding to the user and paired with the private key, a login event published on a smart contract or a distributed ledger, wherein the login event includes first data indicative of an identity of the user and second data indicative of a previous unique identifier corresponding to a previous browser session;

associating the unique identifier with the identity of the user in response to identifying the login event; and granting, via the processing circuitry, the access or transaction request in response to associating the unique identifier with the identity of the user.

9. The computer-implemented method of claim 8, further comprising presenting, via the processing circuitry, a login page to the user device, wherein the login page includes or corresponds to the unique identifier.

10. The computer-implemented method of claim 8, further comprising:

determining, via the processing circuitry, the verification of at least the portion of the authentication data based on the public key; and storing the login event on the smart contract or the distributed ledger in response to determining the verification.

11. The computer-implemented method of claim 8, further comprising granting, via the processing circuitry, the access or the transaction request in response to associating the unique identifier with the identity of the user by directing the user device to a personalized launch page corresponding to the webserver.

12. The computer-implemented method of claim 8, further comprising presenting, via the processing circuitry and to the user device, a login page to the user device, the login page having a string, a QR code, or a bar code associated with the unique identifier and accessible by the user device.

13. The computer-implemented method of claim 12, wherein the string, the QR code, or the bar code comprises the unique identifier.

14. The computer-implemented method of claim 9, comprising:

identifying, via the processing circuitry, a batch of login events including the login event; and identifying, via the processing circuitry, an additional batch of login events after a pre-defined time period lapses from identifying the batch of login events.

15. The computer-implemented method of claim 9, wherein the access or transaction request comprises a request to access a secured website or portion thereof.

16. A system, comprising:

a user device of a user; and processing circuitry corresponding at least in part to a webserver separate from the user device, wherein the processing circuitry is configured to:

receive an access or transaction request corresponding to the user device;

enable a browser session between the webserver and the user device;

present a login page to the user device, the login page having a unique identifier;

receive, from the user device, authentication data indicative of the unique identifier and a private key corresponding to the user;

determine a verification of at least a portion of the authentication data based on a public key corresponding to the user;

identify, in response to the verification, a login event published on a smart contract or a distributed ledger, wherein the login event includes first data indicative of an identity of the user and second data indicative of a previous unique identifier corresponding to a previous browser session;

associating the unique identifier with the identity of the user; and grant the access or transaction request in response to associating the unique identifier with the identity of the user.

17. The system of claim 16, wherein the processing circuitry is configured to present a string, a QR Code, or a bar code in the login page to the user device, wherein the string, the QR code, or the bar code is associated with the unique identifier and accessible by the user device.

18. The system of claim 17, wherein the string, the QR code, or the bar code comprises the unique identifier.

19. The system of claim 16, wherein the processing circuitry is configured to grant the access or the transaction request in response to associating the unique identifier with the identity of the user by directing the user device to a personalized launch page corresponding to the webserver.

20. The system of claim 16, wherein the processing circuitry is configured to:

identify a batch of login events including the login event; and identify an additional batch of login events after a pre-defined time period lapses from identifying the batch of login events.

* * * * *